United States Patent
Kuo et al.

(10) Patent No.: US 8,845,177 B2
(45) Date of Patent: Sep. 30, 2014

(54) BACKLIGHT MODULE AND HOUSING UNIT STRUCTURE THEREOF

(75) Inventors: Yicheng Kuo, Shenzhen (CN); Shih-Hsiang Chen, Shenzhen (CN); Gang Yu, Shenzhen (CN); Gege Zhou, Shenzhen (CN); Weifeng Chen, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 30 days.

(21) Appl. No.: 13/530,886

(22) Filed: Jun. 22, 2012

(65) Prior Publication Data

US 2012/0262946 A1 Oct. 18, 2012

Related U.S. Application Data

(63) Continuation-in-part of application No. 12/991,239, filed as application No. PCT/CN2010/076815 on Sep. 10, 2010.

(30) Foreign Application Priority Data

Jul. 14, 2010 (CN) .......................... 2010 1 0230805

(51) Int. Cl.
*F21V 17/06* (2006.01)
*G02F 1/1335* (2006.01)
*G02F 1/1333* (2006.01)

(52) U.S. Cl.
CPC .................. *G02F 1/133608* (2013.01); *G02F 2001/133314* (2013.01); *G02F 2001/133328* (2013.01)
USPC ........... 362/632; 362/613; 362/621; 362/97.3

(58) Field of Classification Search
USPC ......... 362/632, 611, 613, 608, 621, 561, 511, 362/330, 97.2, 97.3
See application file for complete search history.

(56) References Cited

U.S. PATENT DOCUMENTS

| | | | |
|---|---|---|---|
| 6,636,281 B1 | 10/2003 | Kanatsu | |
| 7,226,184 B2 * | 6/2007 | Takahashi | 362/218 |
| 7,333,163 B2 * | 2/2008 | Huang et al. | 349/58 |
| 7,374,325 B2 * | 5/2008 | Ko | 362/607 |
| 2010/0265722 A1 * | 10/2010 | Sohn | 362/311.02 |

FOREIGN PATENT DOCUMENTS

| | | |
|---|---|---|
| CN | 2852182 Y | 12/2006 |
| CN | 1952745 A | 4/2007 |
| CN | 101086578 A | 12/2007 |
| CN | 101201488 A | 6/2008 |
| CN | 101639183 A | 2/2010 |
| CN | 101672458 A | 3/2010 |
| JP | 2007-127706 A | 5/2007 |

* cited by examiner

*Primary Examiner* — Jong-Suk (James) Lee
*Assistant Examiner* — Leah S Macchiarolo
(74) *Attorney, Agent, or Firm* — Soroker-Agmon

(57) ABSTRACT

The present invention provides a backlight module and a housing unit structure thereof. The backlight module includes a back plate having a first edge, a second edge, a third edge and a fourth edge. The edges of the back plate are provided with a housing including a plurality of housing unit structures. The housing unit structures have a strip shape or an L-shape, respectively, and are disposed on the back plate by connecting or spacing a distance to each others to assemble into a housing. The backlight module uses an adjustable modular design to adjust the number of the housing unit structures for being suitably applied to various backlight modules with different sizes. Except for reducing the use of material, the development cost and time of the backlight module can be saved.

12 Claims, 7 Drawing Sheets

BACKLIGHT MODULE AND HOUSING UNIT STRUCTURE THEREOF

CROSS REFERENCE TO RELATED APPLICATIONS

This application is a continuation in part application of U.S. patent application Ser. No. 12/991,239, filed on Nov. 5, 2010, the disclosure of which is incorporated herein by reference.

FIELD OF THE INVENTION

The present invention relates to a backlight module and a housing unit structure thereof, and more particularly to a backlight module applied to different sizes and capable of saving development cost and time and a housing unit structure thereof.

BACKGROUND OF THE INVENTION

Nowadays, liquid crystal display (LCD) panels are widely applied to various electronic products with growth potential, such as monitors, notebook computers, digital cameras and projectors. After manufacturers of LCD panels fabricate glass substrates, a color filter is firstly combined with the glass substrates, then liquid crystals are filled into the sealed glass substrates and color filter, and further combined with various components, including a backlight module, driver ICs, controller PCBs and etc., to commonly construct a LCD module for selling to downstream manufacturers of notebook computers or LCD monitors.

The backlight module is one of key components of LCD panels. Because the liquid crystals can not emit light by itself, the function of the backlight module is to provide evenly distributed light sources with sufficient brightness for normally showing images. The backlight module comprises various components, such as light sources, a lamp shade, a reflector plate, a light guide plate, a diffusion sheet, a brightness enhancement film and an outer frame.

Generally, the backlight module can be divided into two types, i.e. front light type and back light type. Referring now to FIG. 1, a partially exploded perspective view of a traditional liquid crystal module is illustrated, wherein a liquid crystal module 10 substantially comprises a backlight module 11, a liquid crystal panel 12, a front frame 13, a plurality of first screws 14 and a plurality of second screws 15. The backlight module 11 has a plurality of optical films 110 and a housing 111. The housing 111 is a rectangular outer housing, wherein the optical films 110 are received in the housing 111. Furthermore, the housing 111 has at least one side surface formed with a plurality of first screw holes 112, while the housing 111 further has an upper surface formed with a plurality of second screw holes 113. The liquid crystal panel 12 has a driver circuit board 121 on at least one side thereof, wherein the driver circuit board 121 has a plurality of driver ICs and a plurality of openings 122 on suitable positions thereof. The front frame 13 is a rectangular outer frame, and the front frame 13 has an upper surface formed with a plurality of installation holes 131.

In installation, the liquid crystal panel 12 is firstly disposed on the backlight module 11, and the first screws 14 are used to pass through the openings 122 of the driver circuit board 121 for screw-connecting with the first screw holes 112 on the side surface of the housing 111. Then, the front frame 13 is pressed to dispose on the liquid crystal panel 12, and the second screws 15 are used to pass through the installation holes 131 on the upper surface of the front frame 13 for screw-connecting with the second screw holes 113 on the upper surface of the housing 111. Therefore, the first screws 14 and the second screws 15 can construct the backlight module 11, the liquid crystal panel 12 and the front frame 13 into one-piece liquid crystal module 10.

However, in actual installation, there are still some problems existing in the traditional liquid crystal module 10, as follows: with the continuous increase of types and sizes of LCD panels, the sizes and material of the housing 111 of the backlight module 11 are correspondingly increased. But, various housings 111 with different sizes can not be shared, so that new molds must be continuously developed for manufacturing these housings 111. As a result, the used material of the housing 111 is increased, the development cost and time of the housing 111 is raised, and the material management complexity of the housing 111 is also increased.

As a result, it is necessary to provide a backlight module and a housing unit structure thereof to solve the problems existing in the conventional technologies, as described above.

SUMMARY OF THE INVENTION

A primary object of the present invention is to provide a backlight module, wherein the backlight module including a plurality of housing unit structures. The housing unit structures have a strip shape or an L-shape, respectively, and are disposed on a back plate of the backlight module by connecting or spacing a distance to each others to assemble into a housing. According to the adjustable modular design, the backlight module only needs to adjust the number of the housing unit structures, and thus an entire housing can be constructed. As a result, except for reducing the use of material, the development cost and time of the backlight module can be saved.

A secondary object of the present invention is to provide a housing unit structure of a backlight module, wherein the housing unit structure has a strip shape or an L-shape, respectively, and are disposed on a back plate of the backlight module by connecting or spacing a distance to each others to assemble into the housing. The housing is used to support a display panel and a display frame thereon. The housing unit structures can be applied to backlight modules with different sizes.

To achieve the above object, the present invention provides a backlight module, comprising a back plate having a first edge, a second edge, a third edge and a fourth edge; the backlight module further comprises a plurality of housing unit structures having a strip shape or an L-shape, respectively, and are disposed on the back plate by connecting or spacing a distance to each others to assemble into a housing; wherein each of the housing unit structures has an upper surface and a lower surface, the lower surface is used to be mounted on the back plate, and the upper surface is used to support a display panel and a display frame thereon.

To achieve another above object, the present invention provides a housing unit structure of a backlight module, wherein a backlight module comprise a back plate having a first edge, a second edge, a third edge and a fourth edge; the housing unit structures have a strip shape or an L-shape, respectively, and are disposed on the back plate by connecting or spacing a distance to each others to assemble into a housing; wherein each of the housing unit structures has an upper surface and a lower surface, the lower surface is used to be mounted on the back plate, and the upper surface is used to support a display panel and a display frame thereon.

In one embodiment of the present invention, the housing unit structures having the strip shape are disposed on the first edge, the second edge, the third edge and the fourth edge of the back plate, respectively.

In one embodiment of the present invention, the housing unit structures having the L-shape are disposed on the corners between the edges of the back plate, respectively.

In one embodiment of the present invention, the housing unit structures having the L-shape are disposed on corners between the edges of the back plate, respectively.

In one embodiment of the present invention, the housing unit structures having the strip shape have at least two different types of lengths.

In one embodiment of the present invention, the backlight module further comprise at least one cover member, and the cover member is used to compensate gaps between the housing unit structures, so as to prevent light of the backlight module from being laterally leaked.

In one embodiment of the present invention, the cover member is a shading tape.

DETAILED DESCRIPTION OF THE PREFERRED EMBODIMENTS

Figure 1:
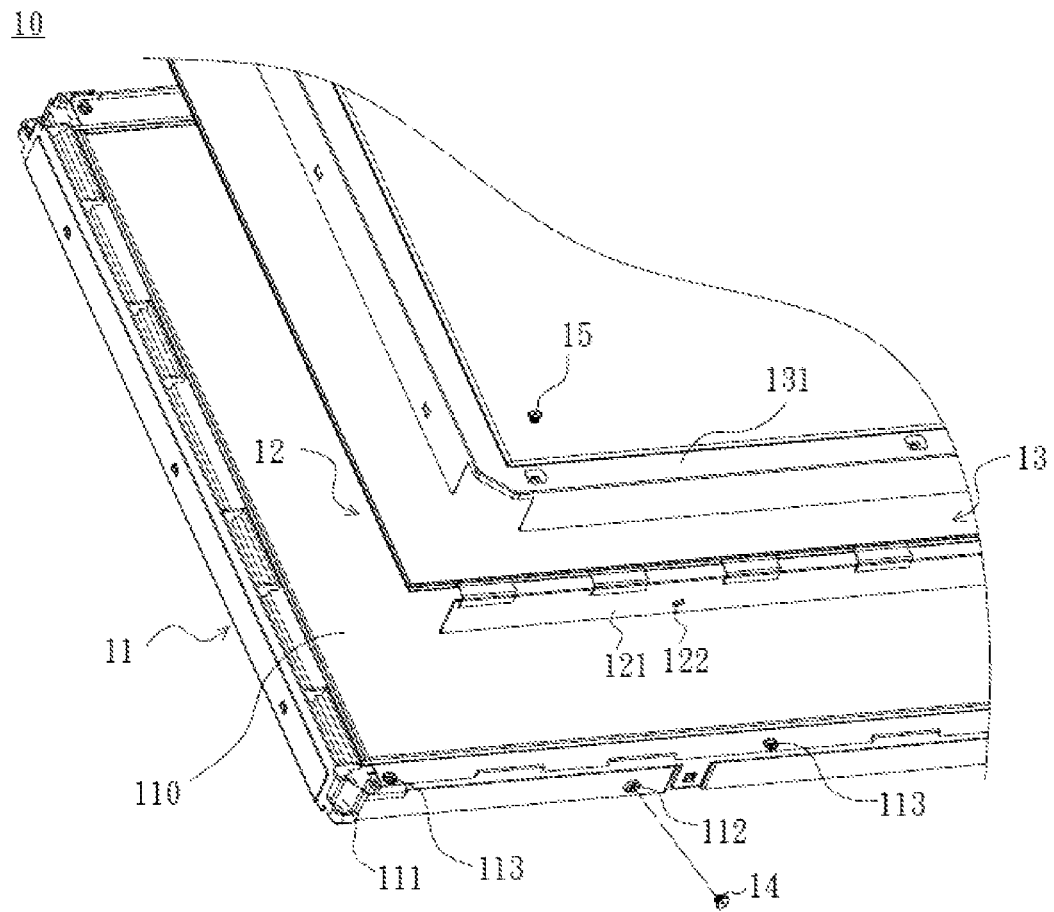
FIG. 1 is an exploded perspective view of a traditional backlight module.
Figure 2:
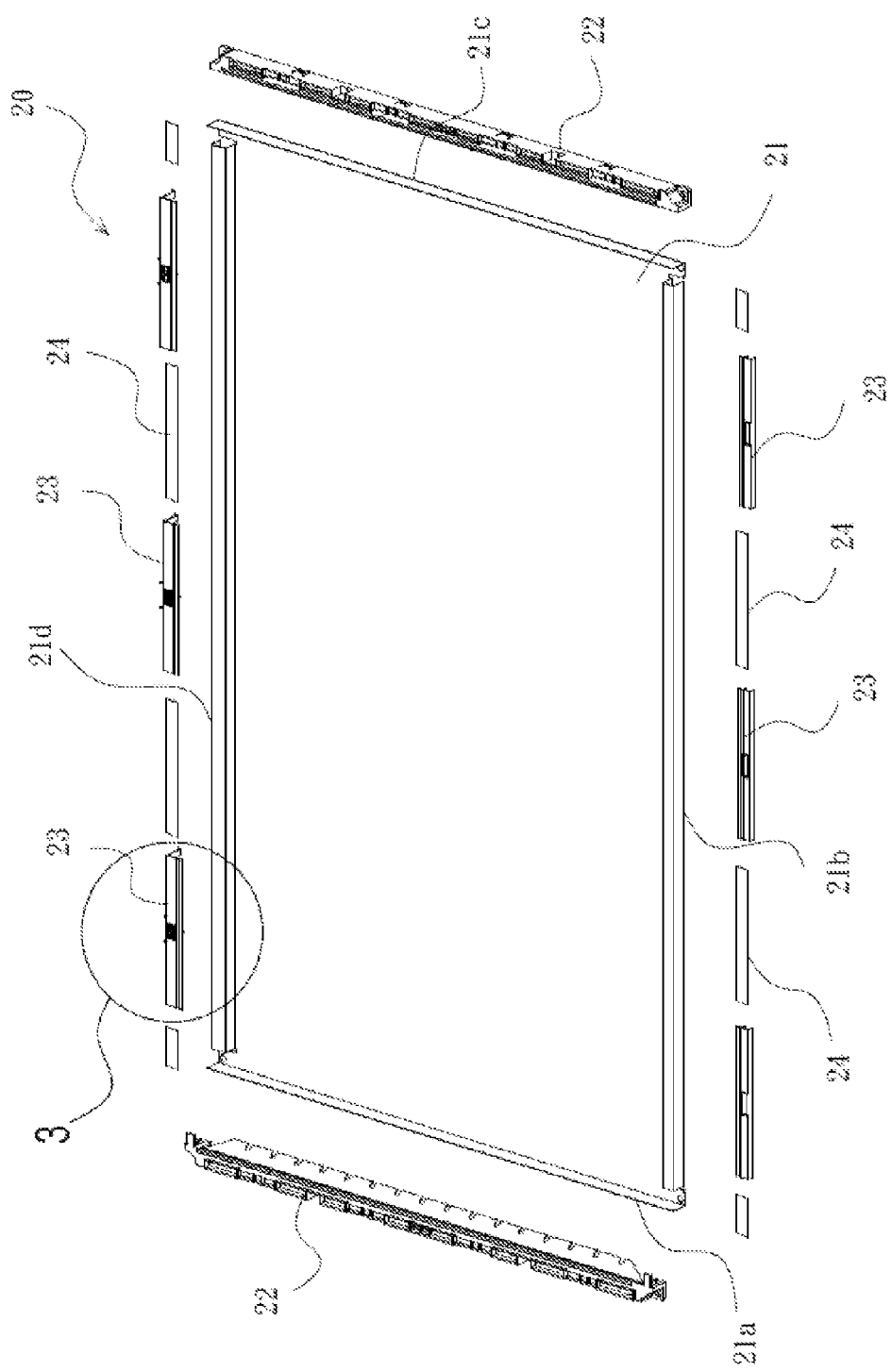
FIG. 2 is a perspective view of a backlight module according to a preferred embodiment of the present invention.

The structure and the technical means adopted by the present invention to achieve the above and other objects can be best understood by referring to the following detailed description of the preferred embodiments and the accompanying drawings, wherein:

Referring now to FIG. 2, FIG. 2 is a perspective view of a backlight module according to a preferred embodiment of the present invention, wherein a backlight module 20 comprises a back plate 21, two housing strips 22, a plurality of housing unit structures 23 and a plurality of buffering strips 24, wherein the back plate 21 has a first edge 21a, a second edge 21b, a third edge 21c and a fourth edge 21d, wherein the first edge 21a is opposite to the third edge 21c, and the second edge 21b is opposite to the fourth edge 21d. The four edges 21a-21d of the back plate 21 are further provided with the two housing strips 22, the plurality of housing unit structures 23 and the plurality of buffering strips 24 thereon.

Figure 4:
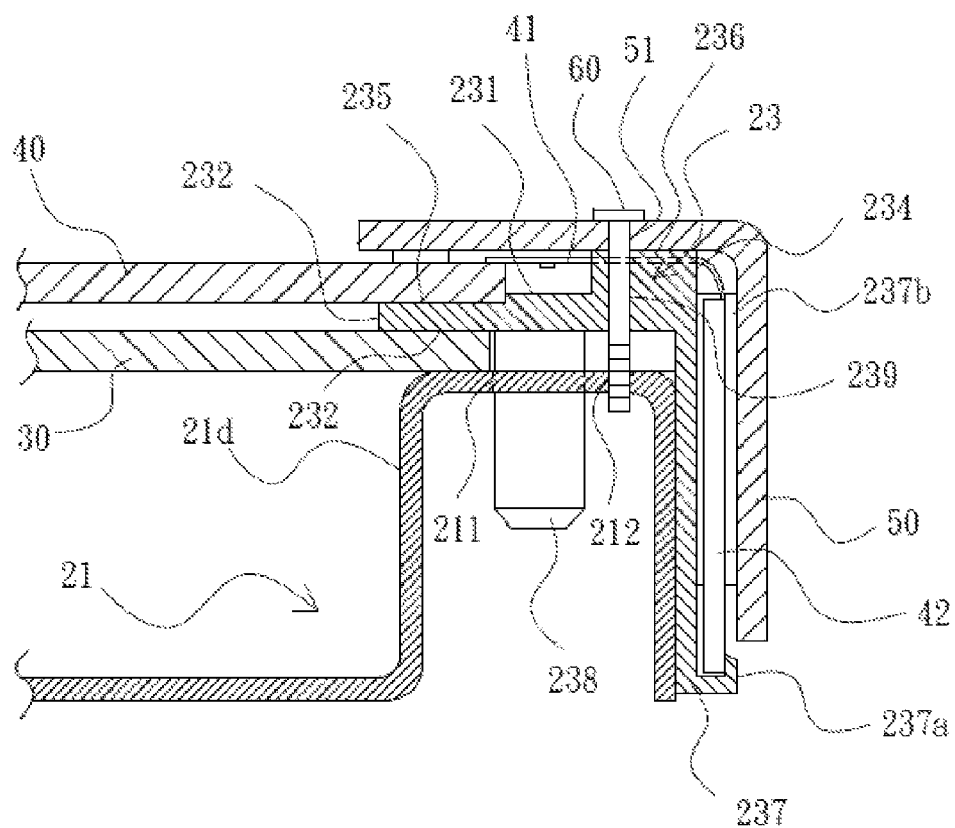
FIG. 4 is a partially cross-sectional view of the backlight module according to the preferred embodiment of the present invention.

Referring to FIG. 2, the housing strips 22 are disposed on the first edge 21a and the third edge 21c, while the housing unit structures 23 and the buffering strips 24 are disposed on the second edge 21b and the fourth edge 21d. The housing strips 22, the housing unit structures 23 and the buffering strips 24 are commonly construct into a housing which has a main function of upwardly supporting a display panel 40 and a display frame 50, in order to combine into a liquid crystal display (LCD), as shown in FIG. 4.

Figure 5:
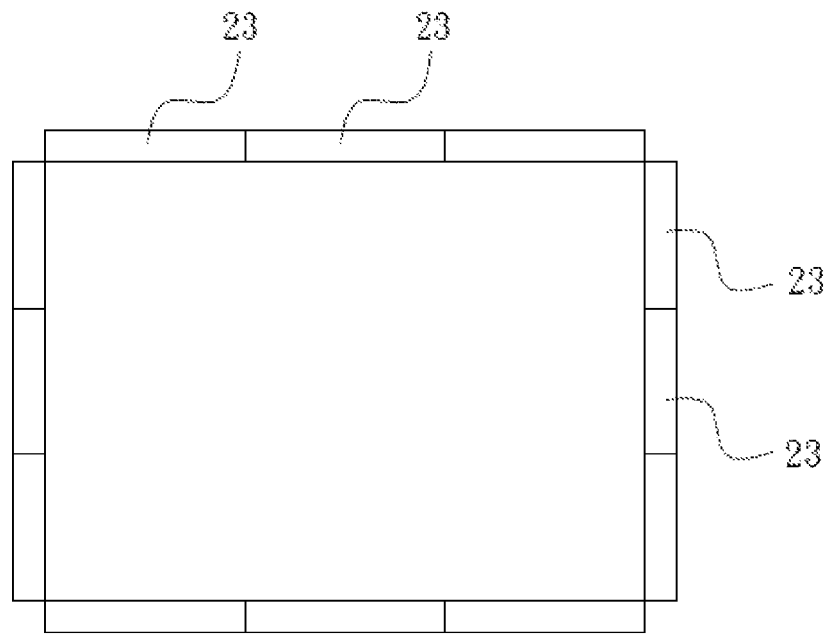
FIGS. 5 to 10 are schematic top views of housing unit structures according to others embodiments of the present invention.

For more details, a main body of the housing strip 22 is substantially a strip made of engineering plastic material and etc., wherein the housing strips 22 is used to upwardly support the display panel 40 and the display frame 50, as shown in FIG. 5, and generally used to mount backlight lamps (not shown). Furthermore, a main body of the housing unit structure 23 is substantially a strip made of engineering plastic material and etc. In the present invention, the length of the housing unit structure 23 is shorter than that of the second edge 21b (or the fourth edge 21d). For example, the length of the housing unit structure 23 is smaller than one half of the length of the second edge 21b (or the fourth edge 21d) of the back plate 21, such as one fourth, one fifth and etc. The present invention is not limited to the foregoing exemplified lengths of the housing unit structure. Thus, the second edge 21b (and the fourth edge 21d) can be used to dispose a suitable number of the housing unit structures 23, such as three. Moreover, the housing strips 22, the housing unit structures 23 and the buffering strips 24 are not a closed one-piece frame, but are separately manufactured from each other. Meanwhile, at least one of the buffering strips 24 is disposed between each two adjacent housing unit structures 23 (or between the housing unit structure 23 and the housing strip 22) for compensating the gap formed by the housing unit structures 23, i.e. for compensating a length difference between the housing unit structures 23 and the second edge 21b (or the fourth edge 21d). Thus, the buffering strips 24 also have a function of preventing an inner space of the backlight module 20 from laterally leaking light therefrom.

Referring to FIG. 2, the backlight module 20 and the housing unit structures 23 of the present invention use an adjustable modular design, so that the housing unit structures 23 can be applied to various backlight modules 20 with different sizes. In other words, for a liquid crystal display with different size, it only needs to adjust the number of the housing unit structures 23 and the gap therebetween, wherein insufficient portion of the length of the edges can be compensated by suitable number of the buffering strips 24. Thus, it can provide a function of supporting the display panel 40 and the display frame 50, as shown in FIG. 4, so that it will be unnecessary to develop various housing molds with different sizes. As a result, except for reducing the use of material, the development cost and time of the backlight module also can be saved.

Figure 3:
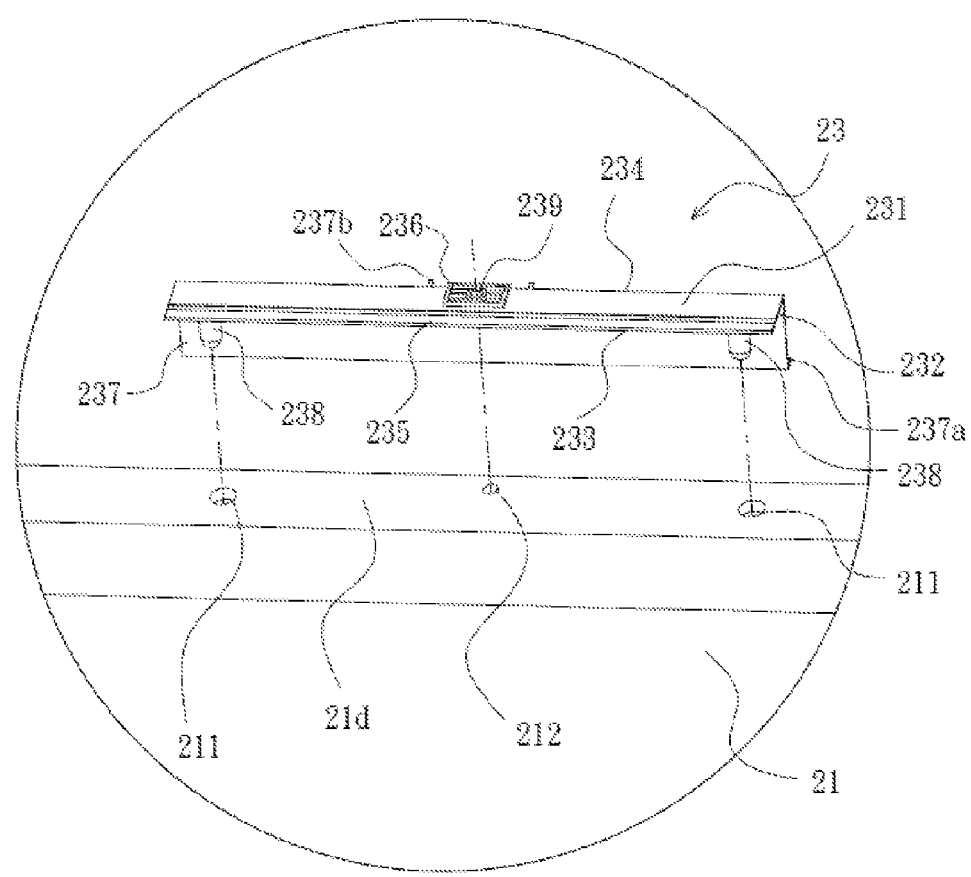
FIG. 3 is a perspective view of a housing unit structure of the backlight module according to the preferred embodiment of the present invention.

Furthermore, referring to FIG. 3, FIG. 3 is a partially enlarged view of FIG. 2, i.e. a perspective view of a housing unit structure of the backlight module according to the preferred embodiment of the present invention. The housing unit structure 23 is preferably made of engineering plastic, and manufactured by plastic injection molding method without limitation. The detailed structures of the housing unit structure 23 are described, as follows:

Referring to FIG. 3, the housing unit structure 23 has an upper surface 231, a lower surface 232, an inner side edge 233 and an outer side edge 234, wherein the lower surface 232 is used to mount on the second edge 21b or the fourth edge 21d.

Referring to FIG. 3, the housing unit structure 23 further comprises a step portion 235, and the step portion 235 is formed on the inner side edge 233 of the upper surface 231, wherein the height of the step portion 235 is lower than that of the upper surface 231 to form a step-like structure. In addition, the housing unit structure 23 further comprises a convex stage 236 which is projected on the upper surface 231 of the housing unit structure 23 and relatively close to the outer side edge 234 of the upper surface 231. The convex stage 236 is preferably formed with a plurality of reinforced ribs (unlabeled) which are distributed around at least one mounting hole 239 for reinforcing the strength of the convex stage 236 and the mounting hole 239 and saving the material thereof. As shown in FIG. 3, the reinforced ribs preferably form a paddy-like (grid-array) arrangement, but the present invention is not limited thereto.

Furthermore, the housing unit structure 23 can further comprise a retaining wall 237, wherein the retaining wall 237 is extended downward from the outer side edge 234 of the upper surface 231, wherein the retaining wall 237 is used to abut against an outer periphery of the edge 21b or 21d of the back plate 21.

Referring to FIGS. 2, 3 and 4, the lower surface 232 of the housing unit structure 23 is further projected downward to form at least one positioning post 238 which is used to be correspondingly engaged with at least one opening 211 of the edge of the back plate 21. The number of the positioning post 238 is preferably two or more for preventing the housing unit structure 23 from being rotated after installation. Besides, the upper surface 231 further comprises at least one mounting hole 239 corresponding to at least one thread hole 212 of the edge of the back plate 21 and at least one aperture 51 of the display frame 50, wherein one screwing element 60 passes through the aperture 51, the mounting hole 239 and the thread hole 212, so as to mount the housing unit structure 23 on the edge of the back plate 21 (such as the fourth edge 21d in FIG. 3). Although the mounting hole 239 as shown in FIG. 3 of the present invention is formed on a central portion of the convex stage 236, but the present invention is not limited thereto, i.e. the mounting hole 239 also can be formed on other position on the housing unit structure 23.

Referring to FIG. 4, FIG. 4 is a partially cross-sectional view of the backlight module according to the preferred embodiment of the present invention, which shows the status of mounting the housing unit structure 23 on the fourth edge 21d. The fourth edge 21d can be selected from various different cross-sectional shapes to match with the housing unit structure 23, wherein the cross-sectional shape of the fourth edge 21d as shown in FIG. 4 is substantially an inverted U-shape.

Referring to FIG. 4, an optical film assembly 30 is mounted on the fourth edge 21d, and the positioning post 238 of the housing unit structure 23 can pass through the opening 211 of the fourth edge 21d of the back plate 21. In addition, the retaining wall 237 of the housing unit structure 23 can abut against the outer periphery of the fourth edge 21d of the back plate 21. Thus, the housing unit structure 23 can clamp the optical film assembly 30.

Moreover, the step portion 235 of the housing unit structure 23 is formed close to the inner side edge 233 of the upper surface 231, while the height of the step portion 235 is lower than that of upper surface 231. Thus, the step portion 235 is suitably used to support the display panel 40 and limit the horizontal movement of the display panel 40. Furthermore, the display panel 40 further comprises: a flexible printed circuit (FPC) board 41 mounted on the fourth edge 21d; and a printed circuit board 42 connected to the flexible printed circuit board 41 in turn. The flexible printed circuit board 41 is extended over the upper surface 231 of the housing unit structure 23, and the printed circuit board 42 is substantially vertically attached to an outer surface of the retaining wall 237. And, as shown in FIG. 4, a lower end of the retaining wall 237 is preferably extended outward to form a hook portion 237a, wherein the hook portion 237a can assist to position the printed circuit board 42 of the display panel 40 for preventing the shaking of the printed circuit board 42.

Referring to FIG. 4, in the last step of entire installation, the display frame 50 is covered on the display panel 40 and the backlight module 20. An inner top surface of the display frame 50 suitably abuts against the convex stage 236. A screwing element 60 passes through the aperture 51 of the display frame 50 and the mounting hole 239 (on the convex stage 236) of the housing unit structure 23 in turn, so as to mount on the thread hole 212 of the fourth edge 21d of the back plate 21 (such as the fourth edge 21d in FIG. 3). Thus, the screwing element 60 can simultaneously connect with the display frame 50, the housing unit structure 23 and the back plate 21, and simultaneously engage with the display panel 40 and the optical film assembly 30, so as to finish the installation of a LCD. In this case, the inner top surface of the display frame 50 or the buffering cushion (not-shown) on the inner top surface can abut against the upper surface of the display panel 40 for preventing the vertical movement of the display panel 40. In addition, an outer surface of the retaining wall 237 preferably further comprises at least two abutting projections 237b for abutting against an inner surface of the display frame 50, so as to prevent the housing unit structure 23 from being accidentally rotated.

Furthermore, although the preferred embodiment of the present invention discloses that the backlight module 20 is commonly constructed by the housing strips 22, the housing unit structures 23 and the buffering strips 24, but the present invention is not limited thereto. In another possible condition of the present invention, the backlight sources of the backlight module 20 don't use the two housing strips 22, so that the backlight module 20 may not comprise the two housing strips 22. In other words, in this condition, the housing unit structures 23 are disposed on the first edge 21a, the second edge 21b, the third edge 21c or the fourth edge 21d, and commonly construct the housing with the buffering strips 24.

Moreover, others possible embodiments of the present invention are described, as follows:

Referring now to FIGS. 5 to 10, FIGS. 5 to 10 are schematic top views of housing unit structures according to others embodiments of the present invention. For conveniently describing, the part of the back plate is omitted in these drawings, there are only shown the position schematic views when a housing is assembled by housing unit structures. In these embodiments, the housing unit structures can have a strip shape or an L-shape, respectively, and can be disposed on the back plate by connecting or spacing a distance to each others to assemble into a housing. The housing unit structures can selectively have the detail structural features of the housing unit structures 23 shown in FIGS. 2 to 4 according to the present invention, but there are shown in a simplified manner in the drawings. The preferred technical solutions that the housing is assembled by the housing unit structures having the strip shape or L-shape are described, respectively, as follows:

In the embodiment as shown in FIG. 5, the housing is completely assembled by the housing unit structures 23 of strip shape without any gap. Besides, for being suitably applied to various back plate with different length and width, the housing unit structures 23 of strip shape can have only one type of length, or the housing unit structures 23 of strip shape also can be designed to have at least two types of different lengths, so as to provide the desired length and width of the housing. In consideration of ensuring the strength of the housing assembled by the housing unit structures and preventing light thereof from being leaked, it will have a higher flexibility to support more housing sizes, so that the present invention can achieve the object of simplifying the housing design.

Figure 6:
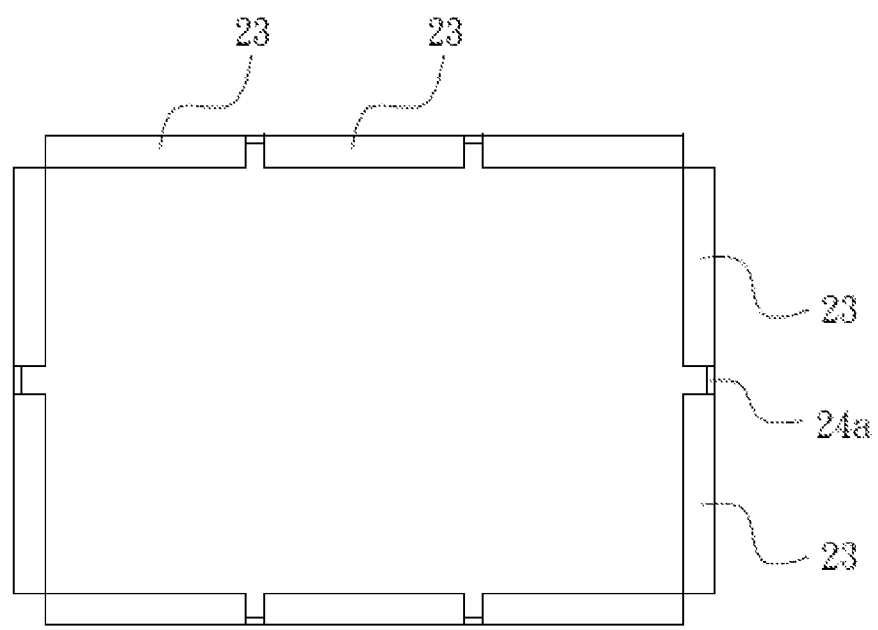

In the embodiment as shown in FIG. 6, this embodiment is similar to the embodiment of FIG. 5, but the difference of this embodiment is that: the housing is mainly constructed by connecting of the strip shaped housing unit structures 23 only having one single size. For being suitably applied to various back plates with different length and width, it can selectively comprise at least one cover member 24a between the strip shaped housing unit structures 23. The cover member 24a, such as an opaque tape (shading tape) or a thin sheet, is used to compensate the gaps between the housing unit structures 23, so as to preventing light of the back module from being laterally leaked. Except for simplifying the housing design, a mold of the housing unit structures can be universal for different backlight modules.

Figure 7:
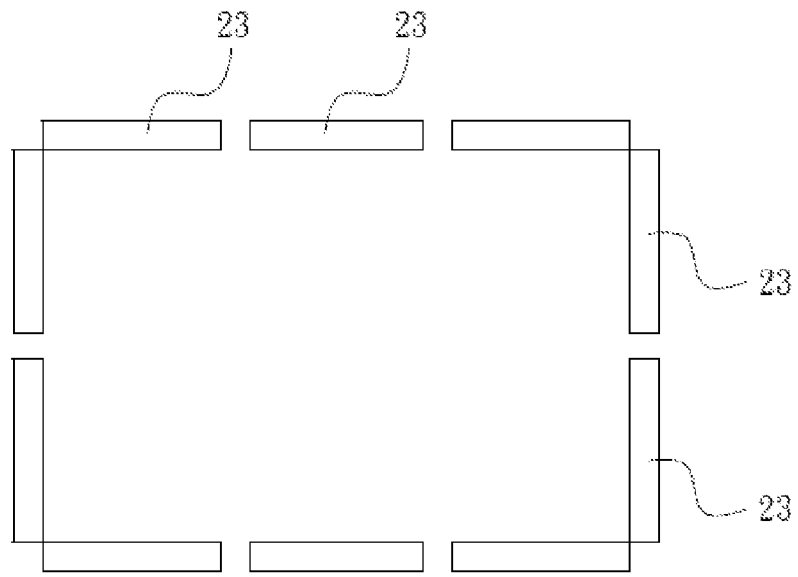

In the embodiment as shown in FIG. 7, this embodiment is similar to the embodiment of FIG. 6, but the difference of this embodiment is that: because it is unnecessary to consider a situation of the light leakage from the light guide plate (e.g. the light guide plate has a function to prevent from lateral light leakage or is designed based on other backlight type), it can comprise no cover member between the housing unit structures 23. The housing can be constructed by the housing unit structures 23 having one single size with gaps therebetween, so as to be applied to various back plates with different size, so that it can further simplify the assembly of the housing.

Figure 8:
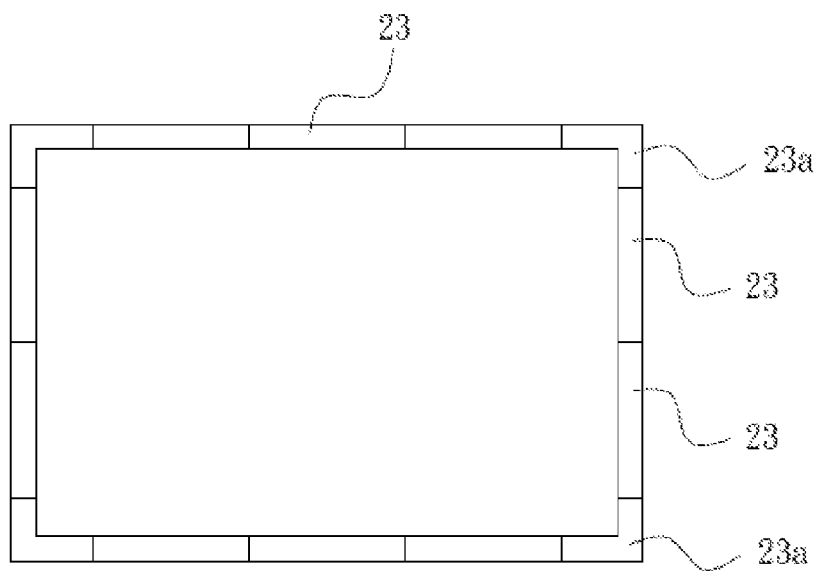

In the embodiment as shown in FIG. 8, this embodiment is similar to the embodiment of FIG. 5, but the difference of this embodiment is that: the housing is still mainly constructed by the connecting of the housing unit structures 23 of strip shape, but the housing further comprises L-shaped housing unit structures 23a for being suitably applied to various back plates with different length and width. the L-shaped housing unit structures 23a can comprise two strip shape housing unit structures which are perpendicular to each other and connect to each other in the end portions thereof (not shown), so it is configured to be L-shaped. Moreover, by the length design of the two ends of the L-shaped housing unit structures 23a, it can further adjust the difference of the desired length and width of the housing. Therefore, except to increase the strength of the whole housing, the L-shaped housing unit structures 23a is advantageous to use the strip shaped housing unit structures 23 of one single size.

Figure 9:
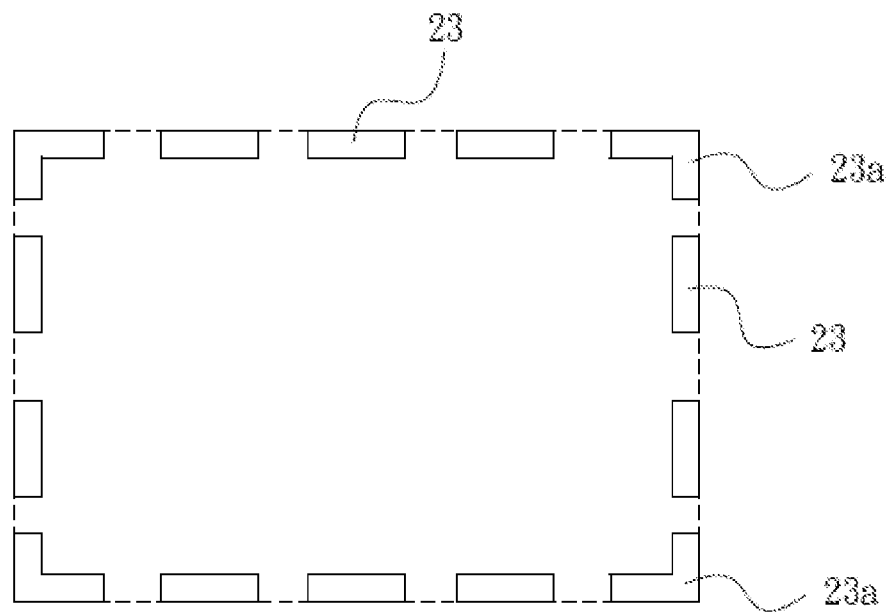

In the embodiment as shown in FIG. 9, this embodiment is similar to the embodiment of FIG. 8, but the difference of this embodiment is that: it is unnecessary to connect between the strip shaped housing unit structures 23 of this embodiment, or between the strip shaped housing unit structures 23 and the L-shaped housing unit structures 23a, and it can selectively provide the cover member (as shown in FIG. 9, there is no cover member to be disposed) or not. Hence, even for various back plates with different sizes, molds of the strip shaped housing unit structures 23 and the L-shaped housing unit structures 23a can be universal.

Figure 10:
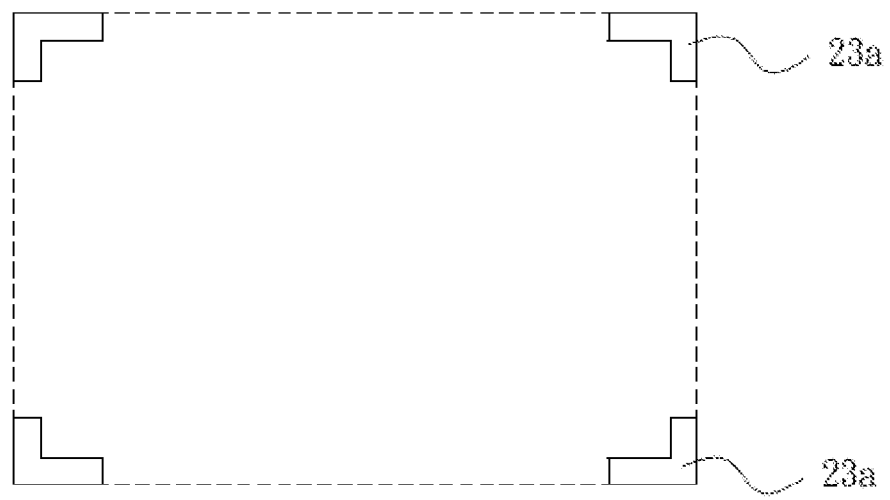

In the embodiment as shown in FIG. 10, this embodiment is similar to the embodiment of FIG. 9, but the difference of this embodiment is that: this embodiment has no strip shaped housing unit structures 23 as shown in FIG. 9. The housing shown in FIG. 10 is completely constructed by the L-shaped housing unit structures 23a with gaps therebetween. Each of the L-shaped housing unit structures 23a does not connect to each others, and it can selectively provide the cover member (as shown in FIG. 10, there is no cover member). Hence, the design of the housing can be further simplified.

As described above, in comparison with the traditional LCD panels which have increasingly types and sizes to cause the increasingly sizes and material of the housings of the backlight modules and thus new molds must be continuously developed to cause the raised development cost and time of the backlight modules, the backlight module 20 according to the present invention uses an adjustable modular design, so that it only needs to adjust the number of the housing unit structures 23,23a, so as to be suitably applied to various backlight modules 20 with different sizes. As a result, except for reducing the use of material, the development cost and time of the backlight module 20 can be saved.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A backlight module, comprising:
a back plate having a first edge, a second edge, a third edge and a fourth edge;
characterized in that: the backlight module further comprises:
a plurality of housing unit structures having an L-shaped top-view profile, respectively, and disposed on corners between the edges of the back plate, respectively, by spacing a distance to each others to assemble into a housing;
wherein each of the L-shaped housing unit structures has an upper surface and a lower surface, the lower surface is mounted on the back plate, and the upper surface supports a display panel and a display frame thereon; and
wherein the L-shaped housing unit structure further comprises a retaining wall extended downward from an outer side edge of the upper surface, wherein the retaining wall is used to abut against an outer periphery of the edge of the back plate; and a printed circuit board of the display panel is attached to an outer surface of the retaining wall, and a lower end of the retaining wall is extended outward to form a hook portion, wherein the hook portion is used to assist to position the printed circuit board of the display panel.

2. The backlight module according to claim 1, characterized in that: the backlight module further comprises a plurality of housing unit structures having a strip shaped top-view profile, respectively, and the strip-shaped housing unit structures are disposed on the first edge, the second edge, the third edge and the fourth edge of the back plate, respectively.

3. The backlight module according to claim 1, characterized in that: the backlight module further comprise at least one cover member, and the cover member compensates gaps between the L-shaped housing unit structures, so as to prevent light of the backlight module from being laterally leaked.

4. The backlight module according to claim 3, characterized in that: the cover member is a shading tape.

5. A housing unit structure of a backlight module, characterized in that: the backlight module comprise a back plate having a first edge, a second edge, a third edge and a fourth edge;
the housing unit structures have an L-shaped top-view profile, respectively, and are disposed on corners between the edges of the back plate, respectively, by spacing a distance to each others to assemble into a housing;
wherein each of the L-shaped housing unit structures has an upper surface and a lower surface, the lower surface is mounted on the back plate, and the upper surface supports a display panel and a display frame thereon; and
wherein the L-shaped housing unit structure further comprises a retaining wall extended downward from an outer side edge of the upper surface, wherein the retaining wall is used to abut against an outer periphery of the edge of the back plate; and a printed circuit board of the display panel is attached to an outer surface of the retaining wall, and a lower end of the retaining wall is extended outward to form a hook portion, wherein the hook portion is used to assist to position the printed circuit board of the display panel.

6. The housing unit structure of the backlight module according to claim 5, characterized in that: the backlight module further comprises a plurality of housing unit structures having a strip shaped top-view profile, respectively, and the strip-shaped housing unit structures are disposed on the first edge, the second edge, the third edge and the fourth edge of the back plate, respectively.

7. The housing unit structure of the backlight module according to claim 5, characterized in that: the backlight module further comprises at least one cover member, and the cover member compensates gaps between the L-shaped housing unit structures, so as to preventing light of the backlight module from being laterally leaked.

8. The housing unit structure of the backlight module according to claim 7, characterized in that: the cover member is a shading tape.

9. The housing unit structure of the backlight module according to claim 5, characterized in that: the L-shaped housing unit structure further comprises a step portion formed on an inner side edge of the upper surface, wherein the height of the step portion is lower than that of the upper surface, and the step portion is used to support the display panel.

10. The housing unit structure of the backlight module according to claim 5, characterized in that: the lower surface is further projected downward to form at least one positioning post which is used to be correspondingly engaged with at least one opening of the edge of the back plate.

11. The housing unit structure of the backlight module according to claim 5, characterized in that: the L-shaped housing unit structure further comprises a convex stage which is projected on the upper surface of the L-shaped housing unit structure and used to support and connect with the display frame.

12. The housing unit structure of the backlight module according to claim 5, characterized in that: a central portion of the convex stage further comprises at least one mounting hole corresponding to at least one thread hole of the edge of the back plate and at least one aperture of the display frame, wherein at least one screwing element passes through the aperture, the mounting hole and the thread hole, so as to mount the display frame and the L-shaped housing unit structure on the edge of the back plate.

* * * * *